(12) United States Patent
Guo et al.

(10) Patent No.: US 10,744,871 B2
(45) Date of Patent: Aug. 18, 2020

(54) FUEL FILLER STRUCTURE FOR VEHICLE

(71) Applicant: TOYOTA JIDOSHA KABUSHIKI KAISHA, Toyota-shi, Aichi-ken (JP)

(72) Inventors: Cheng shu Guo, Miyoshi (JP); Hironori Kojima, Okazaki (JP); Keiji Ishimoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/293,141

(22) Filed: Mar. 5, 2019

(65) Prior Publication Data

US 2019/0291571 A1    Sep. 26, 2019

(30) Foreign Application Priority Data

Mar. 23, 2018    (JP) .................................. 2018-057258

(51) Int. Cl.
*B60K 15/05*    (2006.01)
*E05B 83/34*    (2014.01)

(52) U.S. Cl.
CPC .............. *B60K 15/05* (2013.01); *E05B 83/34* (2013.01); *B60K 2015/0507* (2013.01); *B60K 2015/0515* (2013.01)

(58) Field of Classification Search
CPC .................................. B60K 15/05; E05B 83/34
USPC ........................................................ 296/97.22
See application file for complete search history.

(56) References Cited

U.S. PATENT DOCUMENTS

| | | | | |
|---|---|---|---|---|
| 2,760,811 A | * | 8/1956 | Basferd ................. | B60R 13/105 296/97.22 |
| 5,503,199 A | * | 4/1996 | Whitley, II ............ | B60K 15/04 141/312 |
| 2008/0149640 A1 | * | 6/2008 | Lederer .................. | B60K 15/05 220/288 |
| 2014/0060920 A1 | * | 3/2014 | Tamaoki .................... | B60J 5/00 174/541 |

FOREIGN PATENT DOCUMENTS

JP    2016-022786 A    2/2016

* cited by examiner

*Primary Examiner* — Joseph D. Pape
(74) *Attorney, Agent, or Firm* — Oliff PLC

(57) ABSTRACT

A lock pin is arranged so as to be projected from a side wall of a concave region, in which a fuel filler port of a vehicle is arranged, toward the inside of the concave region. In addition, a retainer placed around the lock pin on an inner side of the side wall of the concave region and a protector supported by the retainer so as to be placed in a region close to the lock pin are provided. The protector has a detent pin to prevent the retainer from rotating relative to the lock pin.

5 Claims, 9 Drawing Sheets

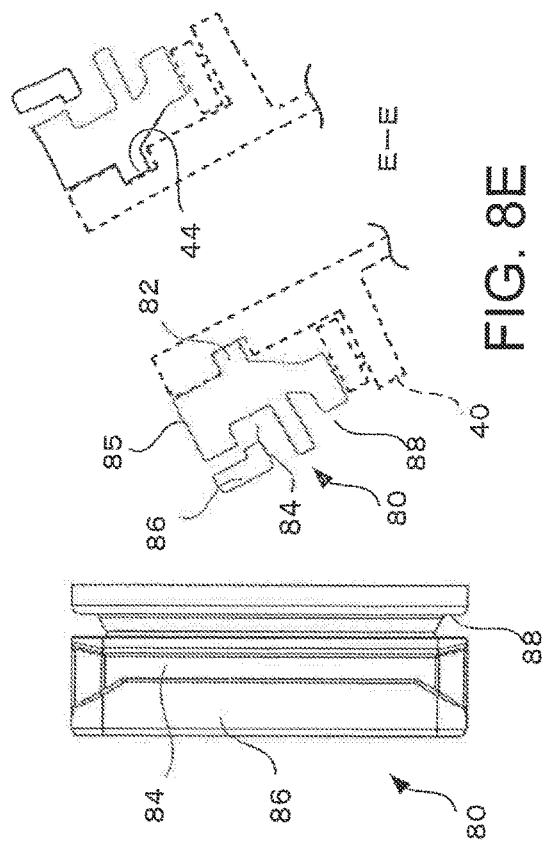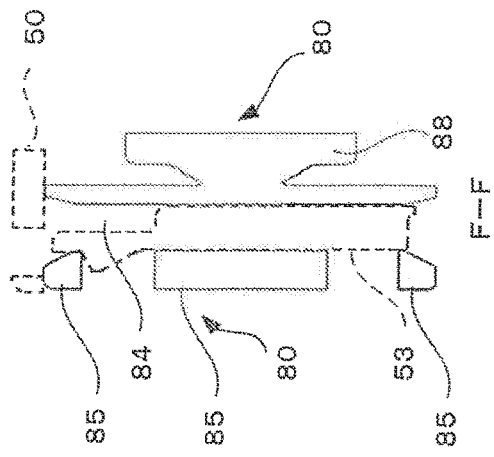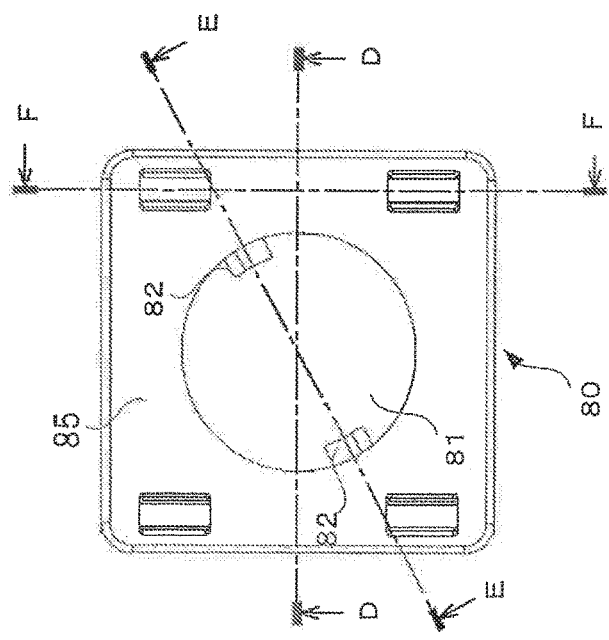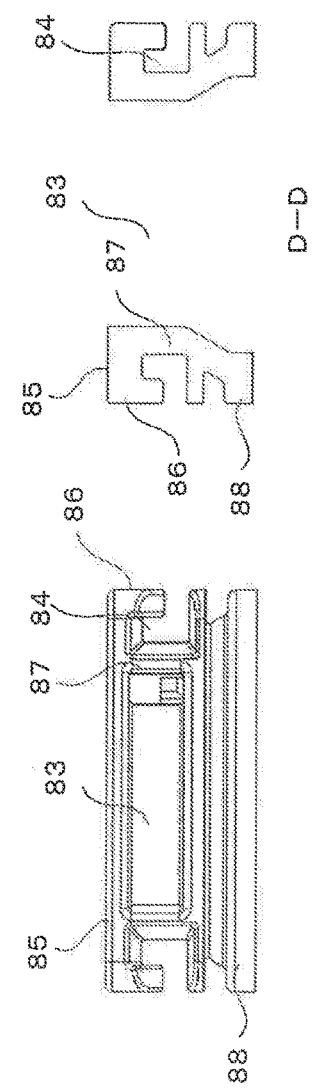

FUEL FILLER STRUCTURE FOR VEHICLE

CROSS REFERENCE TO RELATED APPLICATION

This application claims priority to Japanese Patent Application No. 2018-057258 filed on Mar. 23, 2018, which is incorporated herein by reference in its entirety including the specification, claims, drawings, and abstract.

TECHNICAL FIELD

The present disclosure relates to a fuel filler structure for a vehicle, and in particular relates to a structure for protecting a lock pin of an oil filler port.

BACKGROUND

A fuel filler portion is provided at a rear side surface of a vehicle, for example, on a rear quarter panel. As illustratively shown in FIG. 12, a fuel filler portion 100 includes a fuel filler port 102 and a fuel lid 104.

The fuel filler port 102 is a terminal opening of a fuel inlet pipe, and positioned in a concave region 106 where a part of the rear quarter panel is depressed inward in a vehicle width direction.

The fuel lid 104 is a lid member for covering the concave region 106. The fuel lid 104 is operable to be opened and closed, for example, by means of a hinge mechanism 108 or the like. Further, a lug 110 protruding toward the fuel filler port 102 is disposed on an inner surface of the fuel lid 104 facing the fuel filler port 102. Meanwhile, a lock pin 112 is protruded from a side wall of the concave region 106. When the lock pin 12 is fitted in an opening 114 of the lug 110, the fuel lid 104 is prevented from becoming opened, and is accordingly maintained in a closed state.

The lock pin 112 is movable to advance and retract along its longitudinal direction. The lock pin 112 is pushed by a biasing member (not illustrated), such as, for example, a spring, in such a manner that a tip end portion of the lock pin 112 is exposed in the concave region 106. In operation to return the fuel lid 104 from an opened position to a closed position, the lug 110 pushes and depresses the tip end portion of the lock pin 112 toward a side wall 116 of the concave region 106 while opposing the force exerted by the biasing member. Then, the lug 110 engages with the lock pin 112 when the lock pin 112 meets the opening 114 in the lug 110 and accordingly fits into the opening 114 to establish an engaged state. In the engaged state, the tip end portion of the lock pin 112 is brought into contact with a stopper 118 arranged beneath the opening 114, and accordingly maintained in a slightly depressed state.

The lock pin 112 is provided with various functions including a function of engaging with the fuel lid 104. In JP 2016-22786 A, for example, open and closure signals indicative of opening and closing of a fuel filler port are generated based on advancing and retracting motions of the lock pin 112. For example, in a situation where there is no obstacle in an advancing direction of the lock pin 112, the lock pin 112 is completely protruded into the concave region 106. In such a protruded state of the lock pin 112, the open signal is generated. On the other hand, in a retreated state of the lock pin 112, such as a state where the tip end portion of the lock pin 112 is brought into contact with the stopper 118 of the fuel lid 104, the closure signal is generated. The generated open and closure signals are sent to an ECU which is a control unit of a vehicle. The ECU performs start-up prohibiting control for prohibiting start-up of an internal combustion engine during a period of receiving the open signal.

In addition, the ECU may also in some cases control switching of a seal valve (not illustrated) arranged in a fuel inlet pipe based on the open and closure signals from the lock pin 112. For example, upon receipt of the open signal, the ECU causes the seal valve to be in an opened state. On the other hand, upon receipt of the closure signal, the ECU causes the seal valve to be in a closed state.

CITATION LIST

Patent Literature

Patent Document 1: JP2016-22786 A

Here, even though the fuel lit 104 is in the opened state at the time of the feeding of fuel, there is a danger that the lock pin 112 could be pushed and depressed during the feeding of fuel, resulting in output of the closure signal. As illustratively shown in FIG. 12, a nozzle pipe 122 of a fuel gun 120 is equipped on its root region (on a nozzle cover 124 side) with a splash guard 126 which is a flange member to prevent fuel oil from splashing. During operation to insert the nozzle pipe 122 into the fuel filler port 102, the splash guard 126 may accidentally hit the lock pin 112, and the lock pin 112 may be accordingly pushed and depressed. This raises the possibility that the closure signal could be output, to thereby enable start-up of the internal combustion engine and close the seal valve of the fuel inlet pipe, with a result that it becomes impossible to feed fuel.

To prevent physical contact between the splash guard 126 and the lock pin 112, it may be considered to install a protector for covering a region around the lock pin. In this case, it is desirable to reliably protect the lock pin and to be able to attach the protector easily.

SUMMARY

A fuel filler structure for a vehicle according to the present disclosure includes a fuel filler port arranged in a concave region which is formed on a body panel of the vehicle so as to be recessed toward the inside in a vehicle width direction, a fuel lid operable to be shifted between an opened state and a closed state in which the fuel lid covers the concave region, a lock pin protruded from a side wall of the concave region into the concave region and having a tip end portion which is retractable to move away from and move close to the side wall of the concave region, a retainer positioned around the lock pin on an inner side of the side wall of the concave region, and a protector supported by the retainer so as to be positioned in a region around the lock pin, the protector having a detent pin which prevents rotation of the retainer relative to the lock pin.

In one aspect, a recessed portion may be formed on a circumferential wall of the lock pin, and the detent pin may be inserted into the recessed portion, to thereby prevent the retainer from rotating relative to the lock pin.

Further, in one aspect, an L-shaped groove composed of an axial groove and a circumferential groove may be defined on the circumferential wall of the lock pin, and the retainer may have a hole into which the lock pin is inserted and an engagement pin protruded from the circumference of the hole toward the inside of the hole and inserted into the L-shaped groove.

Still further, in one aspect, the retainer may have a slit, and the protector may have a rib which is inserted into the slit.

According to the present disclosure, the retainer is arranged around the lock pin so as to support the protector, which can facilitate installation of the protector. In addition, because the detent pin is provided to the protector, it is possible to prevent the retainer and the protector being rotated relative to the lock pin.

BRIEF DESCRIPTION OF DRAWINGS

An embodiment of the present disclosure will be described by reference to the following figures, wherein:

FIG. 8A is a plan view of the retainer;

FIG. 8B is a side view of the retainer;

FIG. 8C is a front view of the retainer;

FIG. 8D is a cross sectional end view taken along line D-D indicated in FIG. 8A;

FIG. 8E is a cross sectional end view taken along line E-E indicated in FIG. 8A;

FIG. 8F is a cross sectional end view taken along line F-F indicated in FIG. 8A;

DESCRIPTION OF EMBODIMENT

Figure 1:
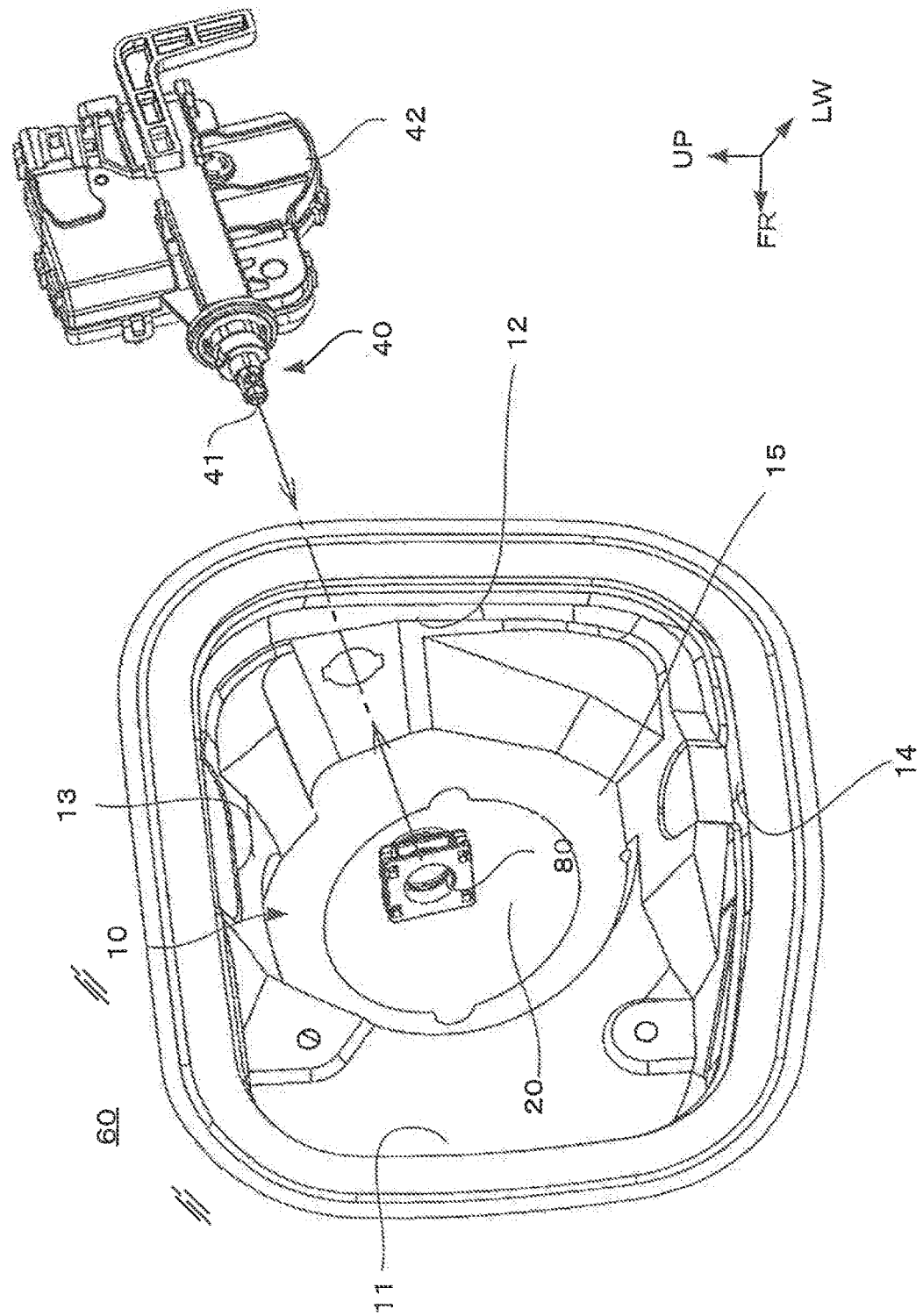
FIG. 1 is a perspective view illustrating a fuel filler structure for a vehicle (before a lock pin is attached) according to an embodiment.
Figure 2:
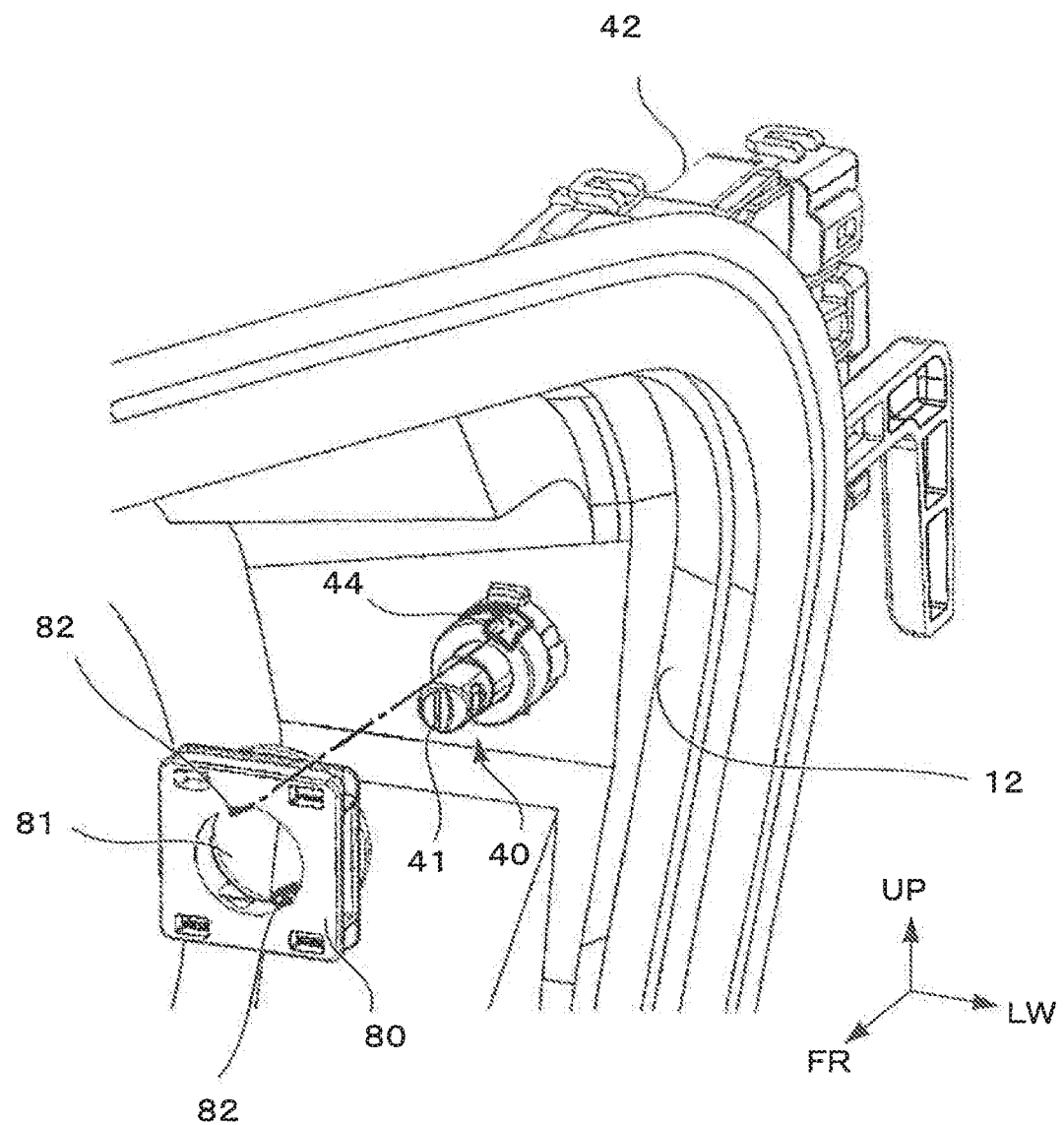
FIG. 2 is a perspective view illustrating the fuel filler structure for a vehicle (before a retainer is attached) according to the embodiment.
Figure 3:
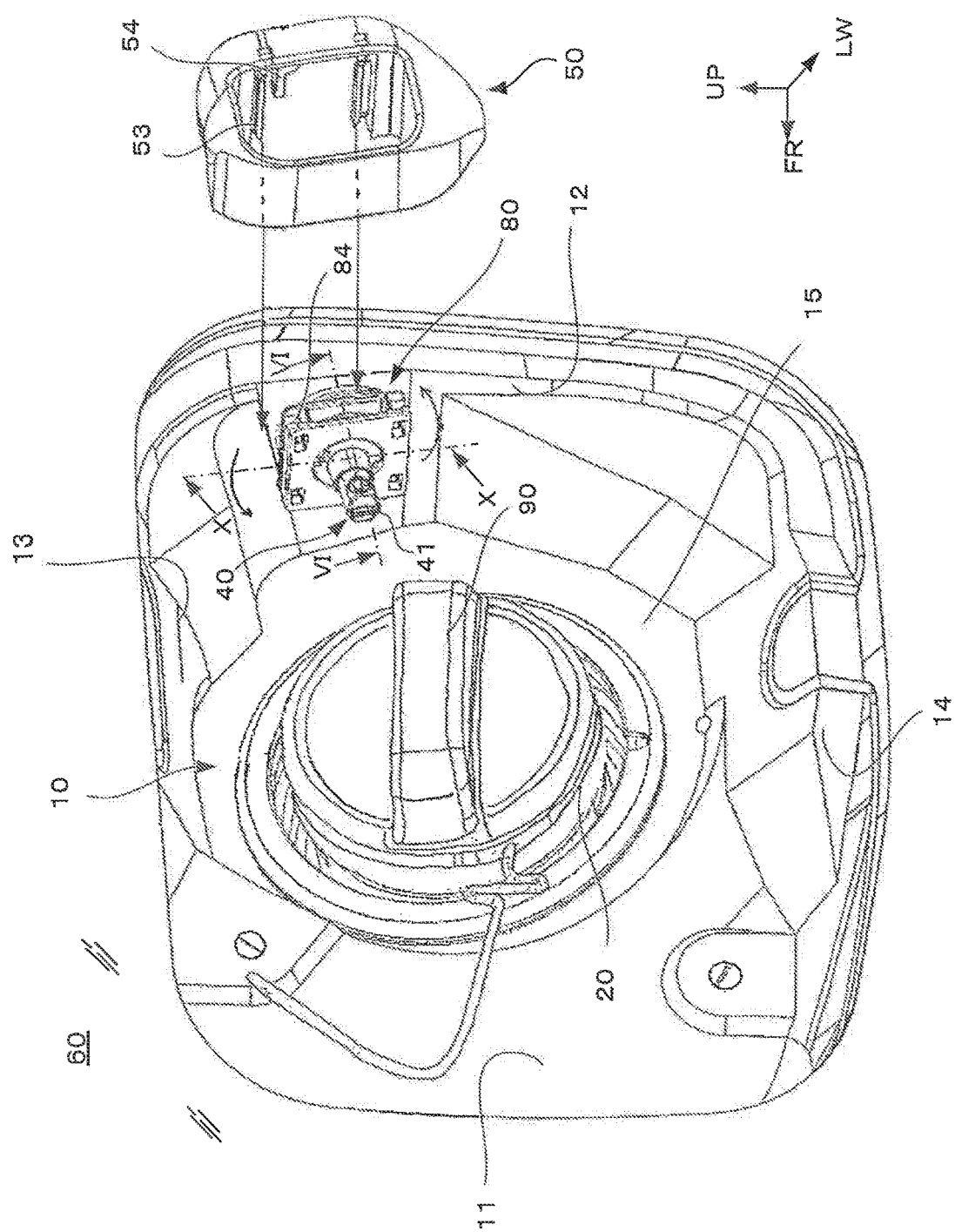
FIG. 3 is a perspective view illustrating the fuel filler structure for a vehicle (before a protector is attached) according to the embodiment.
Figure 5:
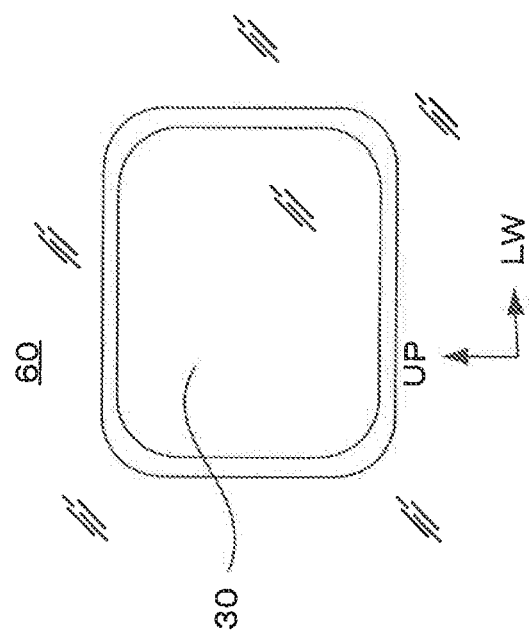
FIG. 5 is a diagram showing a closed state of the fuel lid.

A general configuration of a fuel filler structure for a vehicle according to an embodiment will be described with reference to FIGS. 1 to 3. It should be noted that FIGS. 1 to 3 show the fuel filler structure for a vehicle in a state where a fuel lid is removed, and thus show no fuel lid. Further, the fuel filler structure is shown in FIG. 1 in a state before a lock pin 40 is attached to a concave region 10, in FIG. 2 in a state before a retainer 80 is attached to the lock pin 40, and in FIG. 3 in a state before a protector 50 is attached to the retainer 80.

A front-back direction of a vehicle is indicated with an axis designated by reference sign FR, a vehicle width direction (hereinafter, simply referred to as a width direction where deemed appropriate) is indicated with an axis designated by reference sign LW, and a vertical direction is indicated with an axis designated by reference sign UP. The reference sign FR is an abbreviation of the term "front", and toward the vehicle front is taken as a positive direction of the front-back direction axis FR. The reference sign LW is an abbreviation of the term "Left Width", and toward the left side is taken as a positive direction of the width direction axis LW. Further, upward is taken as a positive direction on the height axis UP.

As shown in FIG. 1, the axis FR, the axis LW, and the axis UP are orthogonal to each other. In the following description, the fuel filler structure for a vehicle according to this embodiment will be explained with reference to the three axes FR, LW, and UP as appropriate. For example, the expression "front end" denotes an end portion, in the positive direction of the axis FR, of an arbitrary component, while the expression "rear end" denotes an end portion, in a negative direction of the axis FR, of an arbitrary component. The expression "the inside in a vehicle width direction" denotes a region located inward in the vehicle width direction along the axis LW, and the expression "the outside in a vehicle width direction" denotes a region located outward in the vehicle width direction along the axis LW. In addition, the expression "upper side" denotes a positive direction side of the axis UP, and the expression "lower side" denotes a negative direction side of the axis UP.

FIGS. 1 to 3 illustratively show perspective views of the fuel filler structure for a vehicle according to this embodiment. The fuel filler structure is provided in a side panel 60 constituting a part of a body panel of the vehicle. For example, the fuel filler structure for a vehicle according to this embodiment is disposed on a rear quarter panel located between a rear door and a rear hood.

The fuel filler structure for a vehicle includes the concave region 10, a fuel filler port 20, a fuel lid 30, the lock pin 40, the protector 50, and the retainer 80. The concave region 10 is formed by depressing a part of the side panel 60 toward the inside in the vehicle width direction through press forming or other processing. The concave region 10 has a rectangular shape in a side view, and includes a front side wall 11 and a rear side wall 12 opposed to the front side wall 11. Further, the concave region 10 also includes an upper wall 13 and a lower wall 14 which are opposed to each other along a vertical direction. In addition, the concave region 10 has a bottom wall 15 enclosed by the front side wall 11, the rear side wall 12, the upper wall 13, and the lower wall 14.

The fuel filler port 20 is arranged in a central region of the bottom wall 15. Note that the fuel filler port 20 can be closed, as shown in FIG. 3, by means of a fuel filler cap 90. The fuel filler port 20 is composed of a terminal opening of a fuel inlet pipe, and fuel is supplied from the fuel filler port 20 through the fuel inlet pipe into a fuel tank (not illustrated). The fuel filler port 20 is upwardly inclined to prevent dripping of fuel from the fuel filler port 20 onto the side panel 60 during fuel feeding.

Figure 4:
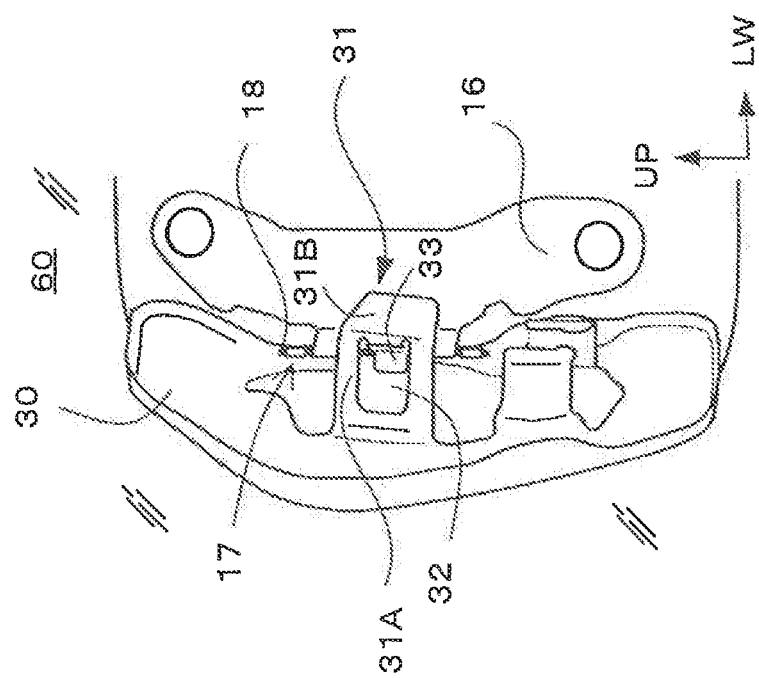
FIG. 4 is a diagram showing an attached state of a fuel lid in a concave region (in an opened state)

FIG. 4 shows the fuel lid 30 in an attached state (and in an opened state). As shown in FIG. 4, a lid bracket 16 is fastened to the bottom wall 15 in a region close to the front side wall 11. The lid bracket 16 has a hinge portion 17 which is formed so as to be raised from a bottom wall 15 side toward outside in the vehicle width direction, and a pin 18 is rotatably retained in an upper end region of the hinge portion 17.

The fuel lid 30 is a lid member for covering the concave region 10, and is hinge-connected via the lid bracket 16 to the bottom wall 15 of the concave region 10. For example, in the fuel lid 30, its end portion close to the front side wall 11 of the concave region 10 is rotatably connected via the pin 18 to the lid bracket 16. In this way, the fuel lid 30 is configured to be movable between a closed state to cover the concave region 10 and an opened state to expose the concave region 10. In addition, a not-illustrated biasing means, such as a spring, is arranged around the pin 18 to always bias the fuel lid 30 from the closed state to the opened state (i.e. in an opening direction).

A lug 31 is protruded (toward the fuel filler port 20) from an inner surface of the fuel lid 30 facing the fuel filler port 20. The lug 31 has an erect portion 31A, which is raised from the inner surface of the fuel lid 30 substantially vertically to the inner surface, and a bent portion 31B, which is extended from an end of the erect portion 31A substantially parallel to the inner surface of the fuel lid 30. An opening 32 is formed in a center region of the erect portion 31A by press forming or the like. Further, a part of the erect portion 31A is bent into the opening 32 to form a stopper 33 beneath the opening 32 (on an inner side in the vehicle width direction shown in FIG. 1).

It is desirable that the distance between the opening 32 and the stopper 33 be smaller than, for example, a distance between a region around a base portion (an end portion of the lock pin 40 in the concave region 10 opposite to a tip end portion 41) of the lock pin 40 on the rear side wall 12 and the tip end portion 41 of the lock pin 40 in an extended state. This allows the lock pin 40 to enter the opening 32 when the fuel lid 30 is in the closed state, and also allows the stopper 33 to push and depress (pushingly retain) the tip end portion 41 of the lock pin 40, so that the lock pin 40 is maintained in a slightly retracted state.

Meanwhile, the length of the bent portion 31B of the lug 31 to its tip end is defined so as to be housed in an opening 55 of the protector 50 without making contact with a front side wall 52a of the protector 50, which will be described further below.

The lock pin 40 is arranged so as to protrude from the rear side wall 12 of the concave region 10 into the concave region 10. The tip end portion 41 of the lock pin 40 is retractable along a linear direction so as to move away from and move close to the rear side wall 12. In addition, the lock pin 40 is biased by a not-illustrated biasing member, such as a spring, in a direction in which the tip end portion 41 of the lock pin 40 moves away from the rear side wall 12. When the fuel lid 30 is in the opened state and no obstacle is present on a moving path of the lock pin 40, the tip end portion 41 of the lock pin 40 is spaced from the rear side wall 12 at the maximum separation distance. This condition of the lock pin 40 is hereinafter referred to as an extended state.

When the fuel lid 30 is returned from the opened position to the closed position, the lug 31 pushes and depresses the tip end portion 41 of the lock pin 40 toward the rear side wall 12 of the concave region 10 against the force exerted by the biasing member. Then, when the lock pin 40 reaches the opening 32 of the lug 31, the lock pin 40 is directed into the opening 32 and accordingly established in an engaged state. It should be noted that in the engaged state, the tip end portion 41 of the lock pin 40 is brought into contact with the stopper 33 arranged beneath the opening 32 and accordingly maintained in a slightly depressed state (retracted state).

The fuel lid 30, which has been in the closed state, can be opened and set in the opened position, for example, by operating a lever arranged in the vicinity of a driver seat, this lever also being referred to as an opener. When the fuel lid 30 is opened, a wire (not illustrated) connected to the base portion (the end of the lock pin 40 opposite to the tip end portion 41) of the lock pin 40 is pulled, which causes the lock pin 40 to be retracted in a direction of moving away from the stopper 33 of the lug 31. As a result, the tip end portion 41 of the lock pin 40 escapes from the opening 32 of the lug 31. Then, the fuel lid 30 which is always biased in the opening direction moves to the opened position in response to the biasing force.

The base portion of the lock pin 40 is connected to a switch mechanism 42, and a signal is output from the switch mechanism 42 based on an advanced or retracted position of the lock pin 40. For example, when the lock pin 40 is in the extended state described above, the switch mechanism 42 outputs an open signal indicative of the opened state of the fuel lid 30. On the other hand, when the lock pin 40 is in the retracted state in which the lock pin 40 is retracted toward the rear side wall 12 with the tip end portion 41 pushed and depressed by the stopper 33 of the fuel lid 30, the switch mechanism 42 outputs a closure signal indicative of the closed state of the fuel lid 30.

The open and closure signals are transmitted to an electronic control unit (ECU) which controls the entire vehicle. Upon receipt of the open signal indicative of the opened state, the electronic control unit performs start-up prohibiting control for an internal combustion engine to prohibit start-up of the internal combustion engine, and switches a seal valve (not illustrated) arranged in the fuel inlet pipe to an opened state.

On the other hand, upon receipt of the closure signal from the switch mechanism 42, the electronic control unit removes the start-up prohibiting control for the internal combustion engine to enable start-up of the internal combustion engine. Further, the electronic control unit switches the seal valve in the fuel inlet pipe to a closed state, to thereby prevent release of fuel vapor from the fuel tank through the fuel filler port 20 into the atmosphere.

Lock Pin

Figure 6:
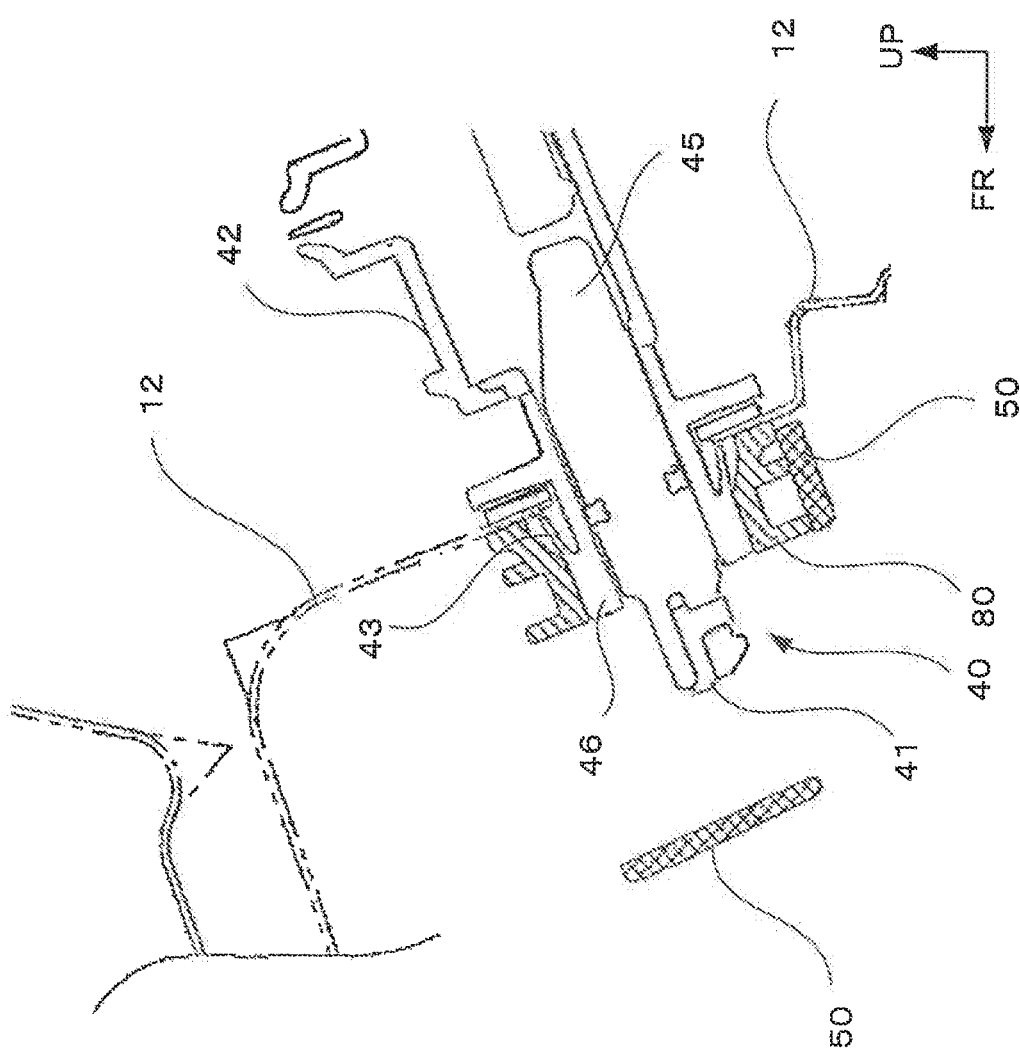
FIG. 6 is a cross sectional view taken along line VI-VI indicated in FIG. 3.

To install the lock pin 40, as shown in FIG. 2, the tip end portion 41 of the lock pin 40 is protruded into the concave region 10. Then, in such a protruded state of the tip end portion 41, the lock pin 40 is fixed. As shown in FIG. 6 (representing a cross sectional view taken along line VI-VI indicated in FIG. 3), the lock pin 40 includes an outer cylinder 46 and a cylindrical retractable member 45 movably housed in the outer cylinder 46. The retractable member 45 is biased forward and configured to output signals when the retractable member 45 is advanced and retracted. Further, in this example, the lock pin 40 has a nail portion 43 broadened outward in a radial direction on a base area of the outer cylinder 46 in a portion of the lock pin 40 protruded into the concave region 10, and the lock pin 40 is fixed to the rear side wall 12 with the nail portion 43 being broadened. It should be noted that a shock absorber, such as a packing member, may be inserted in a region where the lock pin 40 is fixed.

Retainer

When the lock pin 40 is attached to the rear side wall 12, a retainer 80 is attached around the lock pin 40. As shown in FIG. 2, the retainer 80 is formed in a square shape having a small thickness over its entire region, and has a hole 81 defined along a thickness direction in the center of the retainer 80. In addition, a pair of engagement pins 82 are provided so as to protrude from an inner circumference of the retainer 80 into the hole 81. On the other hand, in the lock pin 40, L-shaped axial and circumferential grooves 44a and 44b are defined on a circumferential wall in the base area of the outer cylinder 46 which is inserted into the hole 81 of the retainer 80. More specifically, as shown in FIG. 7, the axial groove 44a is extended (rearwardly) along the axial direction from a tip end portion 41 side of the outer cylinder 46, and the circumferential groove 44b is joined to an end of the axial groove 44a.

Figure 7:
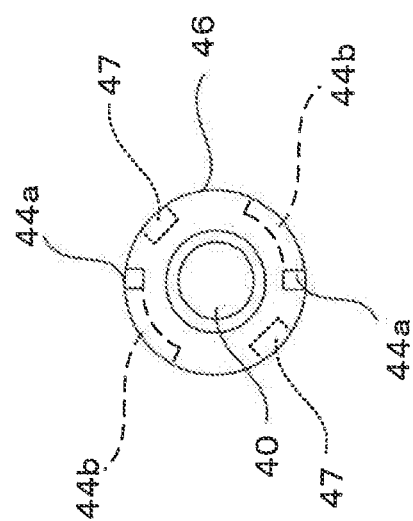
FIG. 7 is a diagram showing the lock pin as viewed from a concave region side (to indicate grooves)

Thus, as shown in FIGS. 7 and 8A, the lock pin 40 is inserted into the hole 81 of the retainer, and in this state, the retainer 80 is moved toward the rear side wall 12 to insert the pair of engagement pins 82 into the grooves 44*a*. Then, when the pair of engagement pins 82 reach the ends of the grooves 44*a*, the retainer 80 is rotated in an anticlockwise direction to allow the pair of engagement pins 82 of the retainer 80 to move through the grooves 44*b*, and rotation of the retainer 80 is stopped when the pair of engagement pins 82 reach the ends of the grooves 44*b*. In this way, the retainer 80 can be installed so as not to be detached from the lock pin 40 along the axial direction.

Here, the structure of the retainer 80 will be explained with reference to FIGS. 8A to 8F. FIG. 8A is a plan view (as viewed from above in the axial direction), FIG. 8B is a right side view, FIG. 8C is a front view, FIG. 8D is a cross sectional end view taken along line D-D, FIG. 8E is a cross sectional end view taken along line E-E, and FIG. 8F is a cross sectional end view taken along line F-F. It should be noted that the cross sectional views in FIGS. 8D to 8F basically show cross sections without hatch lines.

As illustrated in the drawings, the retainer 80 has the square shape in the plan view and a rectangular shape in front and side views. Further, the hole 81 is defined in the center of a top plate 85. In addition, a seat portion 88 is disposed on the bottom, and the hole 81 also penetrates through the seat portion 88. The cylindrical lock pin 40 is inserted into the hole 81. As shown in FIG. 8B, the retainer 80 has no through hole penetrating through right and left side surfaces. On the other hand, as can be seen from the front view in FIG. 8C, an opening 83 is defined so as to penetrate through a center region in front and rear surfaces along a front-back direction, while slits 84 are respectively defined so as to penetrate side regions along the front-back direction. In each of the slits 84, its top is closed by the top plate 85, an erect wall 87 extending upward from the seat portion 88 is arranged on each inner end of the slits 84, and an end wall 86 extending downward from an edge portion of the top plate 85 is arranged on each outer end of the slit 84. The end walls 86 are extended downward, but not to the seat portion 88, which allows each of the slits 84 to communicate, through a gap between a lower end of the end wall 86 and an upper end of the seat portion 88, with the outside on a corresponding right or left side.

As shown in FIG. 8A, a central region of the retainer 80 has the hole 81 into which the lock pin 40 is inserted. Then, as shown in FIG. 8E, the engagement pins 82 are positioned within the grooves 44 in the lock pin 40 which is drawn with broken lines. In addition, as shown by broken lines in FIG. 8F, a rib 53 of the protector 50 is inserted into the slit 84.

Protector

Figure 9A:
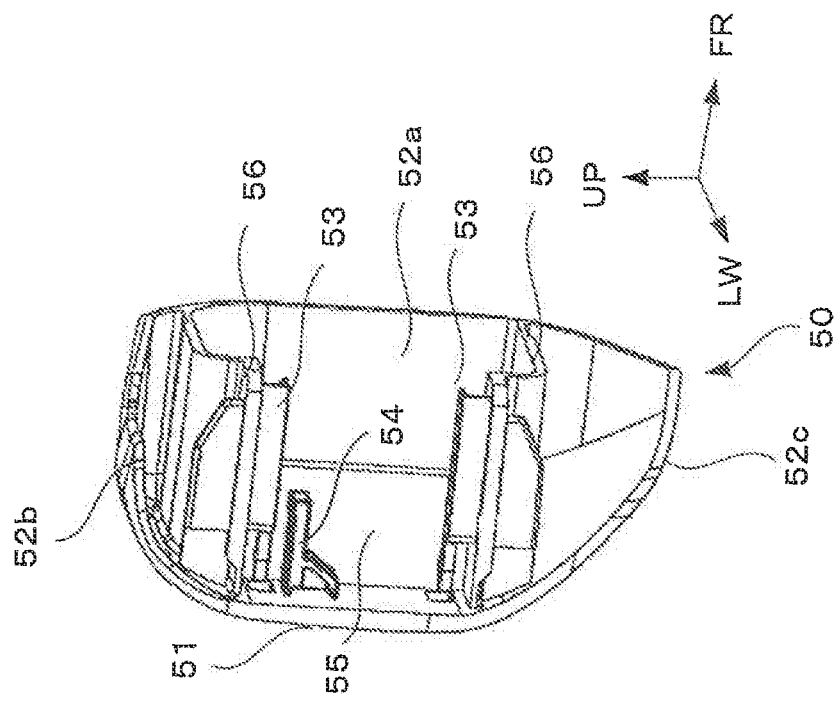
FIG. 9A is a perspective view of the protector as viewed from frontward and outside in a vehicle width direction.
Figure 9B:
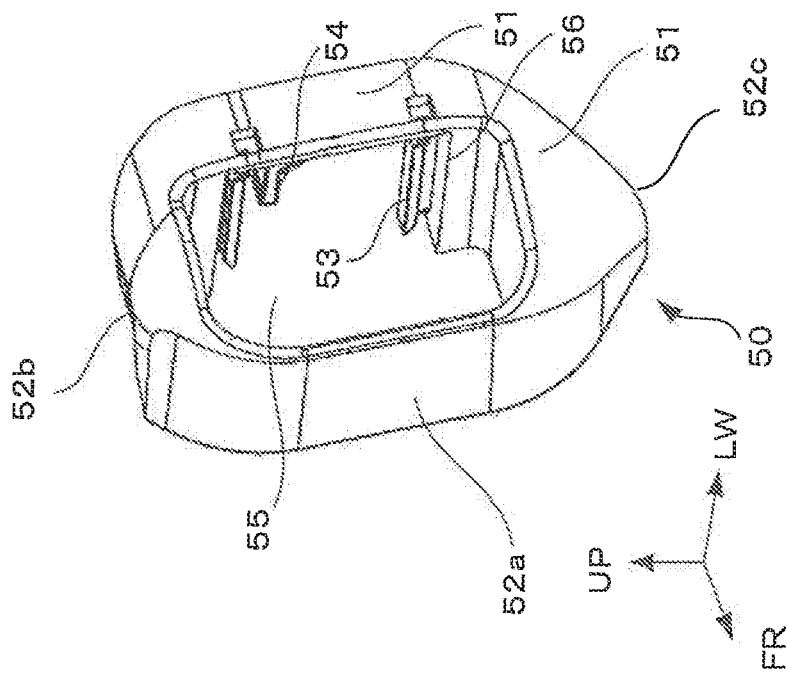
FIG. 9B is a perspective view of the protector as viewed from rearward and inside in the vehicle width direction.

After the retainer 80 is fixed to the lock pin 4, the protector 50 is assembled to the retainer 80. FIGS. 9A and 9B show perspective views of the protector 50, in which FIG. 9A is a diagram as viewed from frontward outside of the vehicle (from outside in the vehicle width direction and from a vehicle front side) and FIG. 9B is a diagram as viewed from rearward inside of the vehicle (from inside in the vehicle width direction and from a vehicle rear side).

The protector 50 has a front side wall 52*a*, an upper side wall 52*b*, and a lower side wall 52*c*. The front side wall 52*a* is opposed to the tip end portion 41 of the lock pin 40. A rear side of the protector 50 is open without having any rear side wall, while an inner region in the vehicle width direction is also open. On the other hand, an outer wall 51 is arranged to connect outer end portions in the vehicle width direction of the side walls 51*a* to 52*c*, and an opening 55 is defined in a slightly frontward center region of the outer wall 51. Here, the outer wall 51 is inclined at its front region toward the inside in the vehicle width direction, and the opening 55 is accordingly oriented to face both outside in the vehicle direction and a front side. The opening 55 is provided to receive the lug 31 of the fuel lid 30, and is therefore defined in a size that does not interfere with the lug 31 when the fuel lid 30 is opened and closed.

A pair of ribs 53 and a pair of support plates 56 are extended toward the inside in the vehicle width direction from a back surface (inside in the vehicle width direction) of the outer wall 51 in a region located on a rear side of the opening 55. A top end of an upper one of the ribs 53 is fixed to a corresponding one of the support plates 56, while a bottom end of a lower one of the ribs 53 is fixed to the other one of the support plates 56. In addition, the support plates 56 are extended from the outer wall 51 and fixed on their front end portions to the front side wall 52*a*. As shown in FIG. 8F, the rib 53 is inserted into the slit 84 of the retainer 80, and the support plate 56 is positioned along the end wall 86 of the retainer 80. That is, when the protector 50 is assembled to the retainer 80 as shown in FIG. 3, the protector 50 is moved from outside in the vehicle width direction toward the retainer 80 so as to insert the rib 53 into the slit 84 in such a manner that the rib 53 and the support plate 56 cooperatively sandwich the end wall 86 therebetween. It should be noted that the rib 53 has, in cross section cut along its short direction, an L shape corresponding to the L shape of the slit 84 in cross section cut along a short direction of the slit 84.

The protector 50 has the front side wall 52*a* which is located between the tip end portion 41 of the lock pin 40 and the fuel filler port 20. In this way, it is possible to reliably prevent the lock pin 40 being contacted by the splash guard of the fuel gun.

The retainer 80 and the protector 50 are composed of, for example, resin materials. Accordingly, when the rib 53 and the slit 84 are defined to have almost equal size, the protector 50 can be attached to the retainer 80 in a state where the protector 50 and the retainer 80 are not detached from each other due to the friction therebetween under normal conditions. However, various stoppers may be installed to ensure that the protector 50 is not detached from the retainer 80.

Detent Pin

The protector 50 is equipped with a detent pin 54. The detent pin 54 is a plate shaped member having a predetermined width and extending from the back surface of the outer wall 51 parallel to the rib 53. When the protector 50 is attached to the retainer 80, a tip end portion of the detent pin 54 is inserted into a recessed portion 47 defined on the outer circumference of the lock pin 40. As shown in FIG. 7, there are a pair of recessed portions 47 separated by 180 degrees on opposite sides of the circumferential wall of the outer cylinder 46. Because only one detent pin 54 is provided, the detent pin 54 is fitted in either one of the pair of recessed portions 47. In addition, the recessed portions 47 are defined at positions which do not overlap the grooves 44*a* and 44*b*. Still further, the recessed portions 47 may be open at their forward ends to the concave region 10, or may be terminated at a distance from the forward ends.

Figure 10:
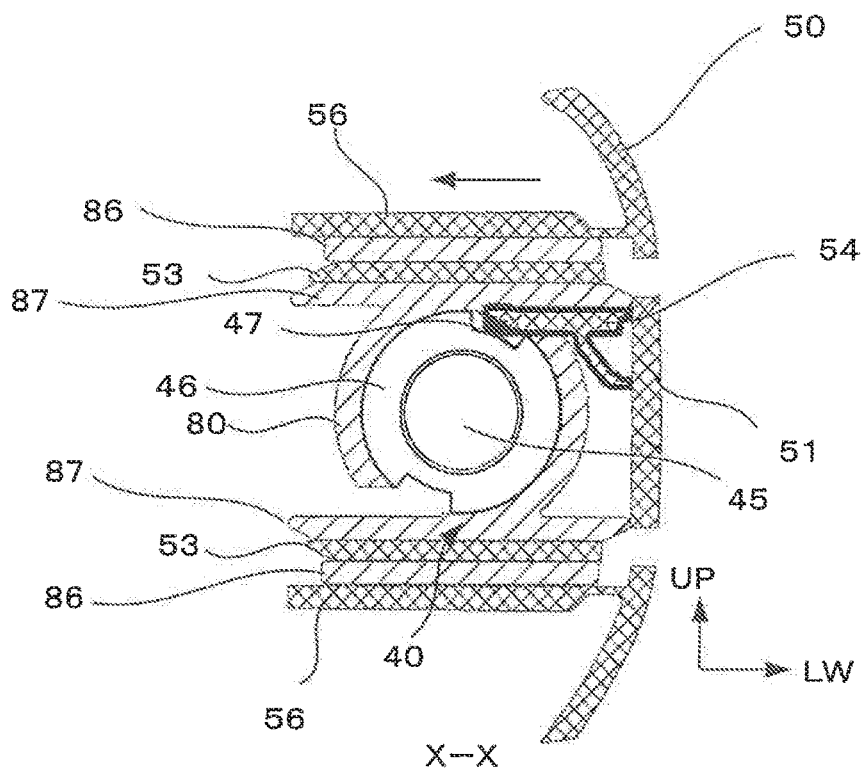
FIG. 10 is a diagram showing an engaged state of a detent pin with respect to the lock pin.
Figure 11:
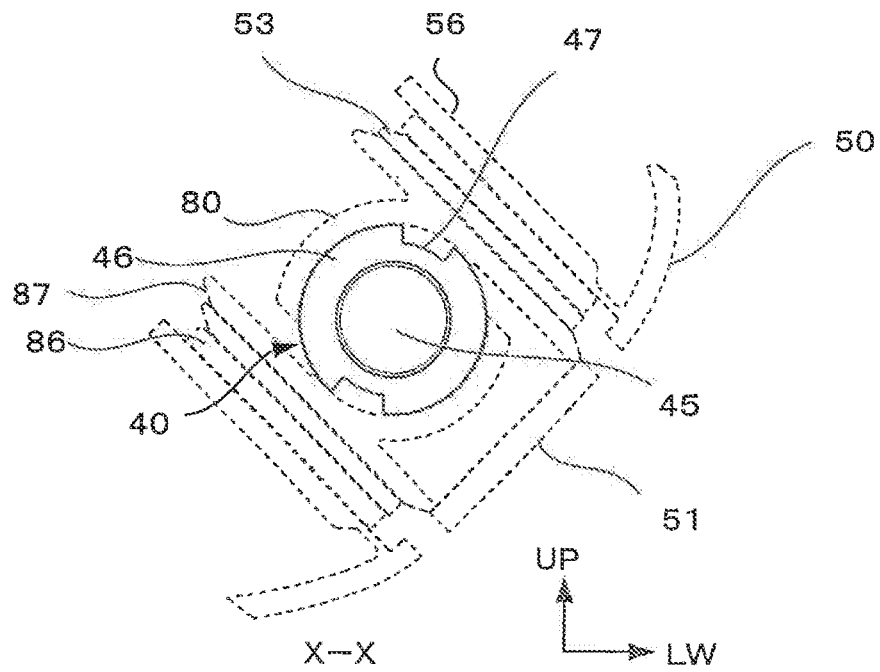
FIG. 11 is a diagram showing a rotated state of the protector when the detent pin is not installed.
Figure 12:
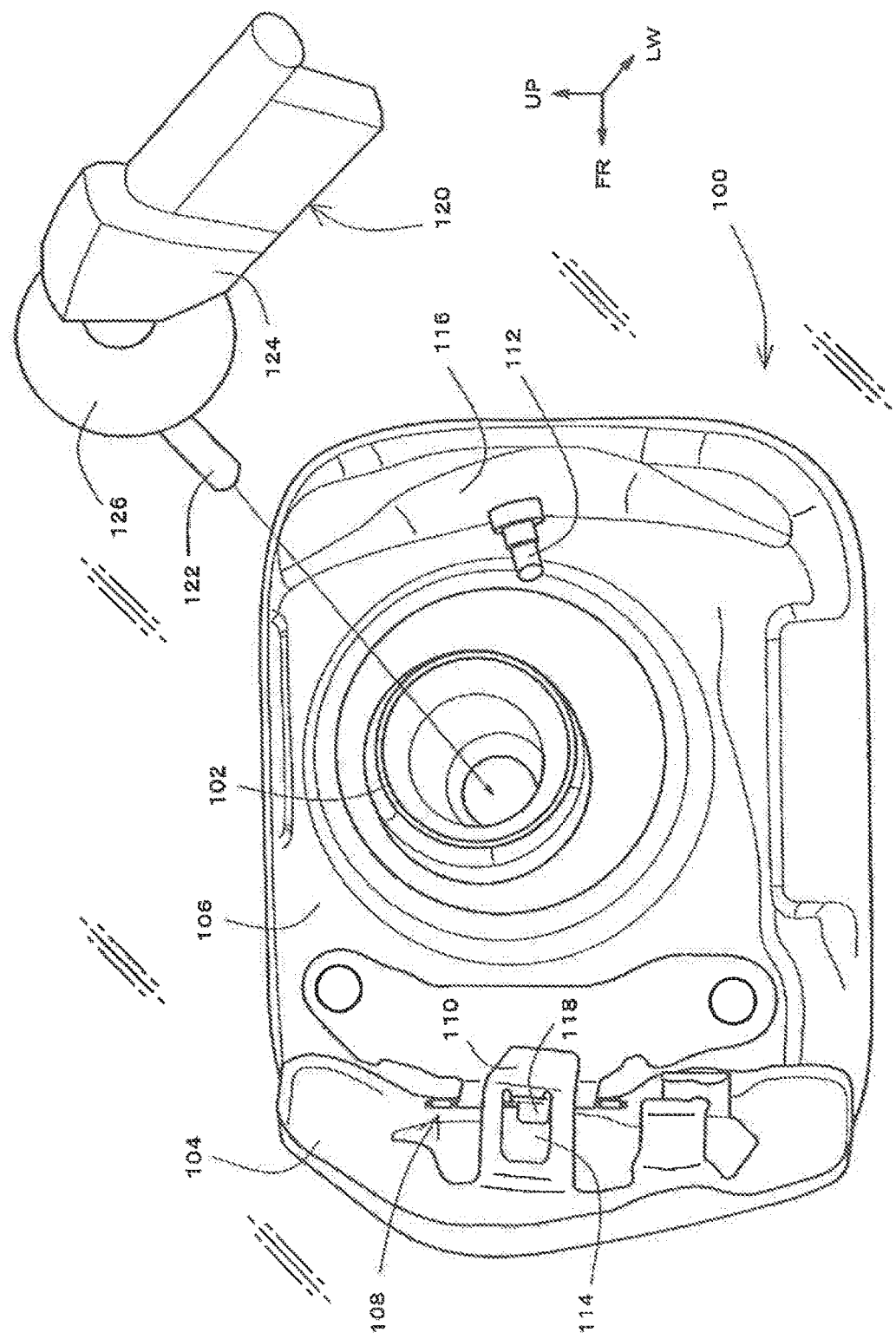
FIG. 12 is a perspective view illustrating a fuel filler structure for a vehicle in a related art.

FIG. 10 shows a cross sectional view taken along line X-X indicated in FIG. 3. The recessed portions 47 extending along the axial direction are provided in the base area on the circumferential surface of the outer cylinder 46 of the lock pin 40, and the tip end portion on the inner side in the vehicle width direction of the detent pin 54 enters one of the recessed portions 47 when the protector 50 is attached to the retainer 80. In particular, when the retainer 80 and the lock pin 40 are assembled, the retainer 80 is rotated and rotatably attached to the lock pin 40. The detent pin 54 whose tip end portion is engaged with the one of the recessed portions 47 functions to prevent the protector 50 from rotating together with the retainer 80.

When the detent pin 54 is not provided, the protector 50 attached to the retainer 80 may be rotated together with the retainer 80 (in a state where the engagement pins 82 are positioned in the circumferential grooves 44b) along the outer circumference of the lock pin 40. When such rotation occurs, the position of the opening 55 will be displaced, resulting in occurrence of a problem such as detrimental influence on operation to open or close the fuel lid 30. However, in this embodiment, because the detent pin 54 is provided, rotation of the protector 50 in conjunction with the retainer 80 can be prevented.

Other Features

Although, in the above-described embodiment, the fuel lid 30 is attached to the front side wall 11 of the concave region 10, and both the lock pin 40 and the protector 50 are arranged on the rear side wall 12, the components may be installed in reversed placement. Specifically, the fuel lid 30 may be attached to the rear side wall 12 of the concave region 10, while the lock pin 40 and the protector 50 may be arranged on the front side wall 11.

In addition, the protector 50 may be configured in such a manner that an end portion of the protector 50 is brought into contact with the bottom wall 15 or the rear side wall 12 at a certain point during rotation of the protector 50 about the lock pin 40, to thereby hinder further rotation of the protector 50.

The invention claimed is:

1. A fuel filler structure for a vehicle, comprising:
    a fuel filler port arranged in a concave region which is formed on a body panel of the vehicle so as to be depressed inward in a vehicle width direction;
    a fuel lid operable to be shifted between an opened state and a closed state of covering the concave region;
    a lock pin protruded from a side wall of the concave region into the concave region, and having a tip end portion which is retractable to move away from and move close to the side wall;
    a retainer positioned around the lock pin on an inner side of the side wall of the concave region; and
    a protector supported by the retainer and positioned in a region around the lock pin,
    wherein the protector has a detent pin which prevents rotation of the retainer relative to the lock pin.

2. The fuel filler structure for a vehicle according to claim 1, wherein a recessed portion is defined on a circumferential wall of the lock pin, and the detent pin is inserted into the recessed portion, to thereby prevent the retainer from rotating relative to the lock pin.

3. The fuel filler structure for a vehicle according to claim 1, wherein:
    an L-shaped groove composed of an axial groove and a circumferential groove is defined on a circumferential wall of the lock pin; and
    the retainer has a hole into which the lock pin is inserted, and an engagement pin which is protruded from the hole toward the inside of the hole and inserted into the L-shaped groove.

4. The fuel filler structure for a vehicle according to claim 2, wherein:
    an L-shaped groove composed of an axial groove and a circumferential groove is defined on the circumferential wall of the lock pin; and
    the retainer has a hole into which the lock pin is inserted, and an engagement pin which is protruded from the hole toward the inside of the hole and inserted into the L-shaped groove.

5. The fuel filler structure for a vehicle according to claim 1, wherein the retainer has a slit, and the protector has a rib which is inserted into the slit.

* * * * *